United States Patent [19]

Huckebrink

[11] 4,450,864
[45] May 29, 1984

[54] ELECTROPNEUMATIC VALVE CONTROL

[75] Inventor: Wilhelm Huckebrink, Oelde, Fed. Rep. of Germany

[73] Assignee: Westfalia Separator AG, Oelde, Fed. Rep. of Germany

[21] Appl. No.: 346,477

[22] Filed: Feb. 5, 1982

[30] Foreign Application Priority Data

Mar. 10, 1981 [DE] Fed. Rep. of Germany ....... 3108976

[51] Int. Cl.$^3$ .................... F16K 31/126; F16K 31/42
[52] U.S. Cl. ............................ 137/624.13; 119/14.28; 137/596.16; 137/625.64; 137/DIG. 8
[58] Field of Search ................. 119/14.28, 14.29, 14.3, 119/14.34, 14.39; 137/596.16, 624.13, 625.64, 625.65, DIG. 8

[56] References Cited

U.S. PATENT DOCUMENTS

| 1,405,104 | 1/1922 | Daysh et al. | 119/14.28 |
|---|---|---|---|
| 2,434,586 | 1/1948 | Reynolds | 119/14.28 |
| 3,122,149 | 2/1964 | Hauk et al. | 119/14.28 X |
| 3,236,208 | 2/1966 | Schilling et al. | 119/14.28 |
| 3,368,584 | 2/1968 | Fairbanks | 137/625.65 |
| 3,517,698 | 6/1970 | Deibel et al. | 137/625.64 |

FOREIGN PATENT DOCUMENTS 2245069 3/1973 Fed. Rep. of Germany ... 119/14.28

Primary Examiner—Gerald A. Michalsky
Attorney, Agent, or Firm—Sprung, Horn, Kramer & Woods

[57] ABSTRACT

An electropneumatic valve control serves for the changeover from vacuum to atmospheric pressure in a working apparatus and is used, for example, as a pulsator for a milker used in vacuum milking installations. The valve control contains a main valve and an auxiliary valve, the main valve being in the form of a conical valve and serving for the communication between the working apparatus on the one hand and the vacuum source and the atmosphere on the other. The auxiliary valve serves for the control of the main valve which is fastened to a diaphragm. The auxiliary valve is in the form of a slide valve and has a recess into which a connecting passage opens during both the working phase and the rest phase of the control, and the connecting passage is connected to a chamber that is continually under vacuum. In the working phase the recess in the control slide valve establishes a connection between the connecting passage and a passage connected to the diaphragm chamber, the control slide valve being actuated by means of a double-action solenoid and the passage connected to the diaphragm chamber being connected to the external atmosphere in the rest phase of the control.

2 Claims, 1 Drawing Figure

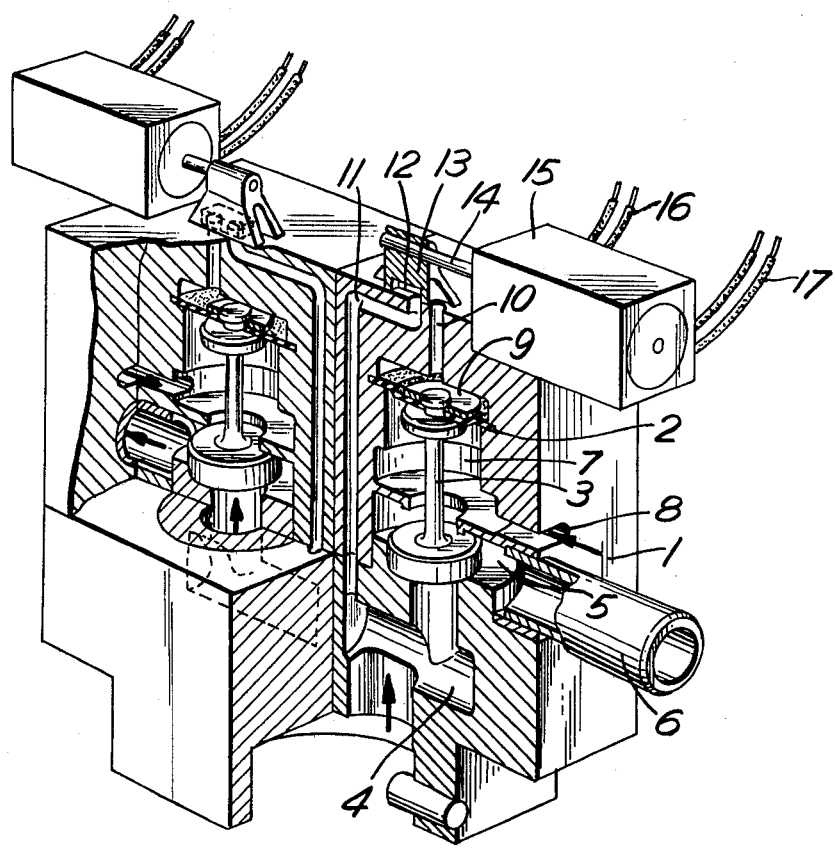

ELECTROPNEUMATIC VALVE CONTROL

BACKGROUND OF THE INVENTION

The invention relates to an electropneumatic valve control, especially for pulsators in milking installations, the valve control having a first valve joined to a diaphragm, and shifting during operation, upon a change in the pressure on the one side of the diaphragm, from the one end-position state to the other, and having an additional, auxiliary valve which is actuated by a solenoid reacting to electrical pulses, and the auxiliary valve for the variation of the pressure on one side of the diaphragm being constructed such that the diaphragm is shifted from either of its positions to the other.

Such a valve control is disclosed, for example, in German Offenlegungsschrift No. 2,245,069, and is proposed for a pulsator which is used in vacuum milking installations. This known pulsator is provided with an electrical system for the production of electrical pulses, which has a direct-current source, the electrical pulses being transformed to mechanical thrusts on a valve connected to a solenoid. The pulsator contains valves which are movable, in response to electrical pulses, between two operating states such that, upon connection to a vacuum source and to a milker, the pulsator provides for connecting the milker alternately to the vacuum source or to the atmosphere. Such a control can be used as a single unit for the so-called in-phase milking process, and can be used in combination with a second control for the so-called alternating milking process.

In the known electromagnetic valve control, electrical power must continue to be fed into the solenoid throughout the working phase, since otherwise the valve connected with the solenoid would close the valve port immediately under the action of vacuum and the atmospheric pressure. The solenoid must accordingly hold open the valve which is under atmospheric pressure in the working phase, and for this purpose a greater power drain is necessary, depending on the opening cross section of the valve.

On account of this, most electrical and electromagnetic power type systems are expensive and the controls are bulky.

SUMMARY OF THE INVENTION

It is the object of the invention to improve the known valve control of the kind referred to above, such that the electrical power requirement of the valve control will be low while the control itself will be smaller and less expensive to manufacture.

This object is accomplished in that the auxiliary valve is in the form of a slide control valve and has a recess into which a connecting passage opens both during the working phase and during the rest phase of the control and is in communication with a chamber that is constantly under vacuum, and in the working phase the recess in the slide control valve establishes the communication between the connecting passage and a passage connected to the diaphragm chamber, the slide control valve being operated by means of a double-acting solenoid, and the passage connected to the diaphragm chamber being in communication with the external atmosphere while the control is in the rest phase.

Inasmuch as the recess in the control slide valve is continually acted upon during both the working and the rest phases by a vacuum source while the outer atmospheric pressure acts on the slide valve body, the slide valve in each working phase will remain in the position in which it is placed by the solenoid, only very brief current pulses being required for shifting the slide valve. Since furthermore the cross section of the connecting passage that is under vacuum and acts upon the slide valve is very small, only slight effort is needed for the shifting of the slide valve and thus little electrical energy is required for this purpose. Therefore it is possible to operate the valve control even with rechargeable batteries.

BRIEF DESCRIPTION OF THE DRAWING

An embodiment of the invention is diagrammatically represented in the FIGURE, and is further described hereinafter, two valve controls being disposed in mirror-image symmetry and being usable as pulsators in milking installations for the alternating milking processes.

DETAILED DESCRIPTION OF THE INVENTION

In the FIGURE, 1 identifies the casing of the valve control, in which a diaphragm 2, tightly clamped in the casing, is disposed and is affixed to a valve body or piston 3. The valve body, when in the lower, rest phase (right side of the drawing), seals a chamber 4, which is continuously under vacuum, from the chamber 5 which is connected to a nipple 6, the nipple communicating in turn with a working apparatus, e.g., a milker which is not shown. In the raised position (left side of the drawing) the valve piston 3 seals chamber 5 from chamber 7, chamber 7 being in continuous communication with the external atmosphere through aperture 8. Above the diaphragm 2 there is disposed a diaphragm chamber 9, which can communicate with the external atmosphere through passage 10 or can be subjected to a vacuum through connecting passage 11, which is connected to chamber 4. The connection between passage 10 and 11 can be produced through a recess 12 in a movably disposed control slide valve 13, the control slide valve 13 being fastened to an armature 14 which in turn can be actuated by a double-acting solenoid 15. The solenoid has electrical terminals 16 and 17 which are connected to an electronic control which is not shown.

The valve control operates in the following manner: In the rest phase, the valve piston 3 lies on the sealing surface of chamber 4, which is under vacuum; chamber 4 is continuously in communication with a vacuum source, e.g., a vacuum pump, which is not represented. The connection between chambers 4 and 5 is thus closed, so that chambers 5 and 7 are under atmospheric pressure through the communication with the aperture 8. The slide valve 13 is in the position indicated on the right side of the drawing, so that the passage 10 and the diaphragm chamber 9 above the diaphragm 2 are likewise under atmospheric pressure. The recess 12 in the slide valve 13 is in communication with the connecting passage 11, which is under vacuum, so that the slide valve 13, which is under external atmospheric pressure, seals the connecting passage 11 from the atmosphere.

At the time $t_0$, through an electronic control which is not represented, a very brief electrical pulse is produced and is delivered through lines 17 to the solenoid 15. The armature 14 connected with the slide valve 13 is drawn into the coil of the solenoid 15, causing the slide valve 13 to shift to the position shown on the left side of the drawing, and a communication is established between the connecting passage 10 and passage 11 through the recess 12 in the slide valve. Through this connection the diaphragm chamber 9 above diaphragm 2 is evacuated and the valve piston 3 connected to the diaphragm is raised to an upper, so-called working position, wherein the valve body seals chamber 5 from chamber 7. In this manner a communication is established between the chamber 4 that is under vacuum and chamber 5, but at the same time a communication is also established between the working apparatus, e.g., milker, connected to the nipple 6, on the one hand, and the vacuum source, e.g., vacuum pump, connected to the chamber 4. Without any further supply of electrical power to the solenoid 15, the slide valve 13 and the valve piston 3 will remain in this position for as long as desired.

At the time $t_1$ an additional brief electrical pulse is produced by the electronic control and delivered to the solenoid 15 through lines 16. The armature 14 is thus extended out of the solenoid, so that the slide valve 13 connected with the armature again assumes the position shown on the right side of the drawing, which is the starting position, wherein passages 10 and 11 are separated from one another, and atmospheric air now flows through passage 10 into the diaphragm chamber 9 above the diaphragm 2. The valve body 3 has returned to the lower position and shuts off the connection between chambers 4 and 5 and thus also between the working apparatus and the vacuum source. Atmospheric air enters the working apparatus through aperture 8, chambers 7 and 5, and nipple 6. Now again, the valve body 3 and the slide valve 13 are able to remain for any desired length of time in their position without the continued delivery of power to the solenoid 15.

The power supply for the solenoid coils and for the electronic control can be provided either from an a.c. source or from batteries, since they consume so little power.

The valve control can be used singly or in parallel as represented in the drawing. In milking installations, two valve controls are used as pulsators for the alternating milking process, the controls operating alternately. While the valve control represented on the right side of the drawing feeds atmospheric air through the nipple 6 to the working apparatus, i.e., the milker, the valve control represented on the left side of the drawing connects a vacuum to the milker for a particular period of time. In this milking process, the two valve controls operate reciprocally, the time periods for the delivery of vacuum or atmospheric air being adjustable in an electronic control system.

Instead of the individual double solenoids, two single solenoids can be used, which are connected to the control slide valve. The valve control can, of course, also be used for many different controlling applications in which a changeover from vacuum to atmospheric pressure or vice versa is involved.

Similar designs, in which, for example, the slide valve 13 is so constructed that it can be actuated by a rotary magnet, with passages 11 and 10 disposed accordingly, are within the scope of the claims.

It will be appreciated that the instant specification and claims are set forth by way of illustration and not limitation, and that various modifications and changes may be made without departing from the spirit and scope of the present invention.

What is claimed is:

1. In an electropneumatic valve control device for use in milking installations, having first valve means including a valve body connected to one side of a diaphragm and movable between a first position and a second position in response to pressure changes on the other side of the diaphragm and electrically actuatable auxiliary valve means for changing the pressure on said other side of the diaphragm to shift the diaphragm and valve body from one of its positions to the other, the improvement wherein: the first valve means comprises a diaphragm chamber at said other side of the diaphragm and a vacuum chamber connectable to a vacuum source during use to maintain a vacuum continuously therein and the auxiliary valve means comprises means forming a first connecting passage in communication with the vacuum chamber and thereby the vacuum therein and a second connecting passage in communication with the diaphragm chamber, a control slide valve body having a recess and movable between a rest position wherein the second connecting passage is connected to the atmosphere and the first connecting passage is sealed by the slide valve body with the vacuum in the first connecting passage acting on the slide valve body to retain same in place, and a working position wherein the recess in the slide valve body connects the first connecting passage and the second passage and thereby the vacuum chamber to the diaphragm chamber with the vacuum acting on the slide valve body to retain same in place, and electromagnetic solenoid means responsive to an electrical pulse for briefly applying a force to the slide valve body to overcome the action of the vacuum thereon and move the slide valve body from the rest position to the working position wherein it is acted on by the vacuum to retain same in place and responsive to the next electrical pulse for briefly applying a force to the slide valve body to overcome the action of the vacuum thereon and move the slide valve body from the working position to the rest position wherein it is acted on by the vacuum to retain same in place until the next pulse.

2. The electropneumatic valve control device according to claim 1, wherein the electromagnetic solenoid means comprises a double acting electromagnetic solenoid.

* * * * *